United States Patent [19]

McConnell

[11] Patent Number: 4,854,541

[45] Date of Patent: Aug. 8, 1989

[54] POWER LINE SUPPORT

[75] Inventor: Kenneth G. McConnell, Ames, Iowa

[73] Assignee: Iowa State University Research Foundation, Inc., Ames, Iowa

[21] Appl. No.: 229,310

[22] Filed: Aug. 8, 1988

[51] Int. Cl.$^4$ ............................ H02G 7/14; F16L 3/00
[52] U.S. Cl. ..................................... 248/565; 248/613;
248/58; 174/42; 267/226
[58] Field of Search ..................... 248/565, 636, 218.4,
248/610–613, 638, 562, 65, 58; 174/42, 45 R;
267/18, 195, 221, 226

[56] References Cited

U.S. PATENT DOCUMENTS

| | | | |
|---|---|---|---|
| 1,204,253 | 11/1916 | Diercks | 267/226 |
| 1,703,397 | 2/1929 | Kirk et al. | 267/226 X |
| 1,840,177 | 6/1932 | Transom | 267/226 |
| 2,589,726 | 3/1952 | Neufeld | 248/613 X |
| 2,867,298 | 1/1959 | Roder | 267/226 X |
| 3,185,417 | 5/1965 | Suozzo | 248/613 X |
| 4,006,873 | 2/1977 | Berger | 208/613 |

FOREIGN PATENT DOCUMENTS

| | | | |
|---|---|---|---|
| 221608 | 4/1985 | Fed. Rep. of Germany | 174/42 |
| 592301 | 5/1979 | U.S.S.R. | 174/42 |

*Primary Examiner*—Alvin C. Chin-Shue
*Attorney, Agent, or Firm*—Zarley, McKee, Thomte, Voorhees & Sease

[57] ABSTRACT

The power line support of the present invention comprises a support tower having a lower end supported on the ground and having an upper end. A power line energy absorber is attached to the upper end of the support tower and comprises a housing attached to the support tower, a reciprocating piston within the housing and pneumatic damping chambers within the housing on opposite sides of the piston for yieldably resisting reciprocating movement of the piston within the housing. A cable is connected to the piston and extends over a pulley downwardly to the electrical insulator which connects to the power line where it supports the power line above the ground. Dynamic energy from the power line is transferred upwardly through the cable to the piston and is absorbed by virtue of the compression and expansion of the air within the chambers on opposite sides of the piston.

10 Claims, 1 Drawing Sheet

U.S. Patent
Aug. 8, 1989
4,854,541
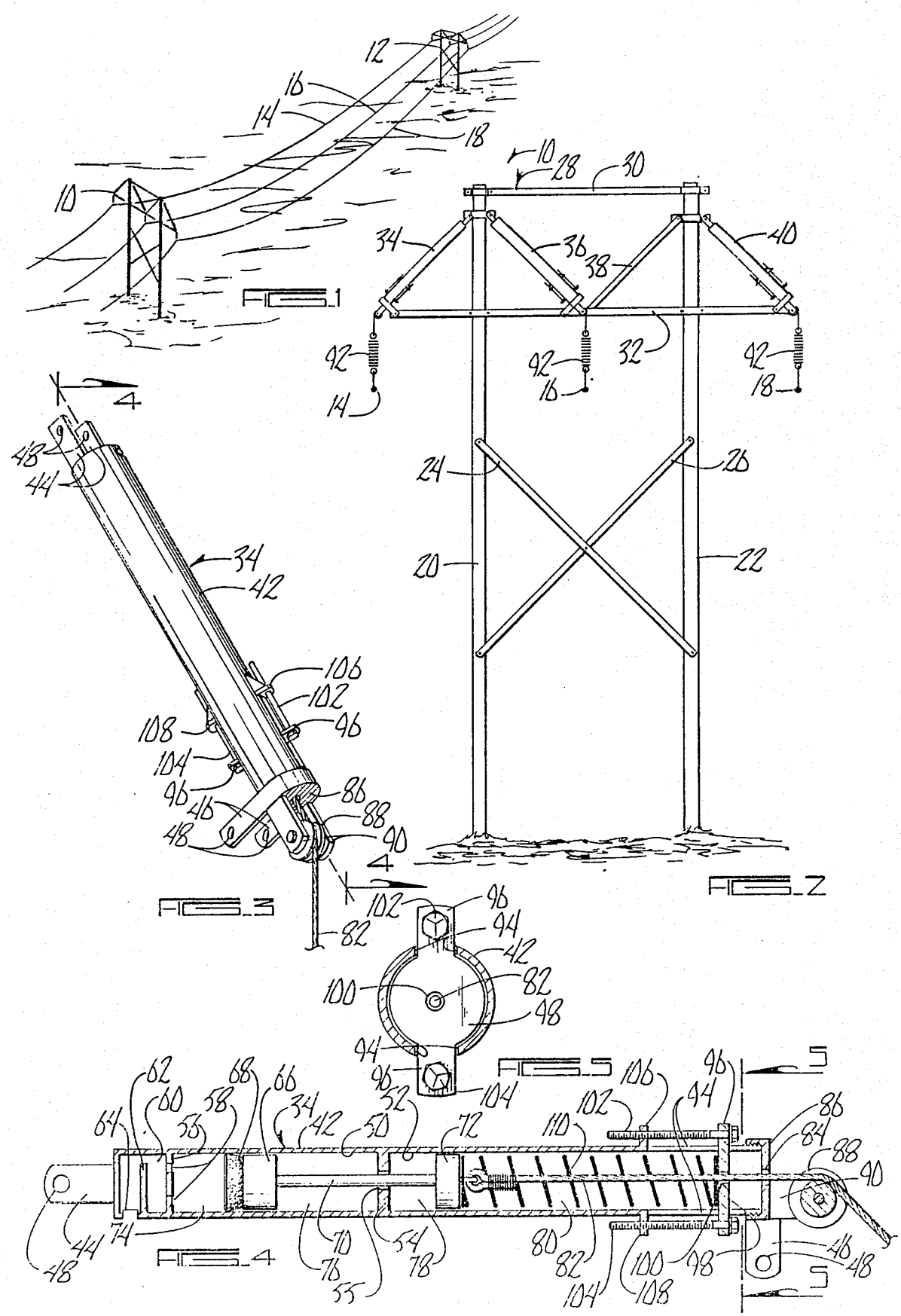

POWER LINE SUPPORT

BACKGROUND OF THE INVENTION

This invention relates to a power line support, and more particularly to a power line support having a damping device for minimizing the irregular loads which the power lines place on the power line support.

Power line hardware and supporting structures are subjected to a wide variety of dynamic loads that are the result of wind induced vibrations of the power lines. These vibrations range from very mild but wearing vibrations to heavily damaging motions of the wires, conductors, or cables.

There are many types of wire vibration that can cause severe damage to the supporting poles or structures which support the cables above the ground. One type of motion is "vertical galloping" wherein adjacent spans of power lines move in a wave-like motion in a vertical direction, but out of phase with one another. A second type of cable motion is "blowout galloping". This motion is similar to vertical galloping except that the motion takes place in a plane inclined with respect to the vertical direction. The wind causes the cable to blow horizontally away from the supporting structure to cause this blowout galloping which causes heavy lateral dynamic loads on the poles.

A third type of cable motion is "longitudinal galloping" wherein the elongated electric line moves longitudinally back and forth in an axial direction causing the insulator which supports the cable to swing back and forth in a pendulum fashion.

It is therefore desirable to provide a support mechanism which can minimize the dynamic loads placed on the support structure in response to these various types of motion.

Therefore, a primary object of the present invention is the provision of an improved power line support structure having an energy absorbing or damping mechanism.

A further object of the present invention is the provision of a power line support structure having an energy absorbing mechanism which minimizes the dynamic loads placed on the support structure in response to the above described galloping motions of the power lines.

A further object of the present invention is the provision of an energy absorption device within the support structure which replaces existing structural braces and which can be easily used to replace existing structural braces.

A further object of the present invention is the provision of a support structure having an energy absorption device which still performs the same function as the prior existing braces.

A further object of the present invention is the provision of a support structure having an energy absorption device containing a cable which is attached to the electrical insulator which supports the power line so that the electrical insulator and the power line can move relative to the support structure.

A further object of the present invention is the provision of a power line support which is economical to manufacture, durable in use and efficient in operation.

SUMMARY OF THE INVENTION

The present invention includes a support tower having a lower end adapted to be supported on the ground and having an upper end. A power line energy absorber is operatively attached to the upper end of the support tower and comprises a housing, a reciprocating member movably mounted to the housing for reciprocating movement with respect thereto in first and second opposite directions, damping means within the housing for yieldably resisting reciprocating movement of the reciprocating member in both of said first and second directions, and spring means yieldably urging the reciprocating member in the first direction.

A cable is connected to the movable piston member and is connected to an electrical insulator which in turn is connected to a power line for supporting the power line above the ground. The weight of the power line creates a force which when transmitted through the cable to the reciprocating member exerts a force on the reciprocating member in its second direction.

The damping means within the cylinder comprises a piston having closed air chambers on opposite sides thereof. Each of the closed chambers includes an air escape opening for permitting the limited passage of air between the atmosphere and the chambers on opposite sides of the piston in response to movement of the piston in its first and second directions.

A second piston may be provided on the piston rod and may be enclosed within a second compartment so that additional damping effect is provided by the compressed air on opposite sides of the second piston as well as the compressed air on the opposite sides of the first piston.

A spring adjustment means is provided for adjusting the compression of the spring. This permits the adjustment of the height to which the spring holds the power line.

The combination of the spring and the pneumatic damping means provided by the two pistons causes a damping effect on any of the galloping motions described above which are created in conventional power lines. As the galloping motions occur, the spring and the two pistons create a damping effect to the galloping motion and minimize a transfer of the destructive forces from the galloping power lines to the support poles of the support structure. This minimizes the damage to the support tower in response to these galloping motions.

BRIEF DESCRIPTION OF THE FIGURES OF THE DRAWINGS

FIG. 1 is a perspective view of two high power line towers of the present invention supporting three high power lines.

FIG. 2 is an elevational view of the power line tower of the present invention.

FIG. 3 is an enlarged perspective view of the power line energy absorber of the present invention.

FIG. 4 is a sectional view taken along line 4—4 of FIG. 3.

FIG. 5 is a sectional view taken along line 5-5 of FIG. 4.

DETAILED DESCRIPTION OF THE PREFERRED EMBODIMENT

Referring to the drawings, the numerals 10 and 12, generally designate two high power line towers which support three high voltage power line phases, 14, 16, and 18. Each power line phase 14, 16, and 18 may have one, two or more electrical conductors in a given phase. Each tower 10 comprises a pair of spaced apart vertical poles 20, 22 which have their lower ends embedded within the ground. One or more pairs of cross braces 24, 26, are attached to the two poles 20, 22. A truss assembly 28 is connected to the upper ends of poles 20, 22. Truss assembly 28 comprises an upper horizontal truss member or cable 30, a lower horizontal truss member 32 and four angular truss members or struts 34, 36, 38, 40. Truss member 38 is a typical fixed truss member such as found on the conventional high voltage power line tower devices. However, truss members 34, 36, and 40 are energy absorbers of identical construction such as shown in FIGS. 3, 4 and 5. Energy absorber 34 comprises an outer cylindrical housing 42 having a pair of mounting ears 44 at one end and a second pair of mounting ears 46 at the opposite end, each of which are provided with mounting holes 48 for permitting the mounting of energy absorption member 34 between upper end of pole 20 and lower horizontal truss member 32 as shown in FIG. 2. The upper end of member 36 is similarly connected to the upper end of pole 20, and the upper ends of member 40 is similarly connected to the upper end of pole 22.

The description of absorption member 34 is as follows. Within cylindrical housing 42 are a first cylindrical compartment 50 and second cylindrical compartment 52 which are separated by a partition 54 having a central opening 55 therein providing communication between compartments 50, 52. At one end of compartment 50 is an end wall 56 having one or more air apertures 58 therein. Beyond end wall 56 is a baffle compartment 60 having at least one baffle 62 therein and an outlet opening 64 providing communication to the exterior of cylindrical housing 42. Thus, air is free to communicate from compartment 50 through air openings 58 into baffle chamber 60 and outwardly through outlet opening 64 to the atmosphere on the bottom of absorber 34, when absorber 34 is installed.

Also, mounted within compartment 50 is a piston 66 provided with a seal gasket 68 and a piston rod 70 which extends through central opening 55 in partition 54. Within compartment 52 is a second piston 72. Piston 66 divides compartment 50 into a first chamber 74 and a second chamber 76. The second piston 72 divides compartment 52 into a third chamber 78 and a fourth chamber 80.

Attached to second piston 72 is a flexible cable 82 which extends outwardly through an opening 84 in an end wall 86 of housing 42. Cable 82 is then trained around a pulley 88, which is pivotally mounted between two pulley ears 90. Cable 82 then is connected to an insulator 92 (FIG. 2) which at its lower end is connected to and supports high voltage power line 14. Devices 36 and 40 are similarly connected to power line phases 16, 18 respectively.

Adjacent end wall 86 of housing 42 are a pair of longitudinally extending slots 94 in which are slidably mounted the tab ends 96 of a spring stop plate 98 which is fitted within compartment 52. Spring stop plate 98 is provided with a central opening 100 for accommodating the flexible cable 82. Stop plate 98 is capable of sliding longitudinally along the axial length of compartment 52. A pair of lead screws 102, 104 are attached to spring stop plate 98 and are rotatable therewith. These screws 102, 104 are threadably extended within tabs 106, 108 mounted on the outside of housing 42 so that rotation of lead screws 102, 104 will cause spring stop plate to move toward and away from partition 54.

Compressed between spring stop plate 98 and second piston 72 is a coil spring 110 which is preferably a non-linear spring. That is, the resistive force which the spring provides changes in direct proportion to the amount of distortion of the spring 110. Thus, if spring 110 is compressed to a large extent it resists with a greater force than the force with which it resists at the initial compression thereof. Spring 110 is normally in a state of compression acting to urge piston 72 against the force of the weight of the high power line 14 which is transferred to piston 72 through cable 82. The lead screws 102, 104 are used to adjust the compression within spring 110.

The structure and operation of damping devices 36, 40 are identical to the structure and operation of device 34 described above.

In operation, when the high voltage power lines 14, 16, and 18 are stationary and are not being acted upon by external forces, such as wind, or other outside forces, the energy absorption devices 34, 36, 40 are in a state of equilibrium with the springs 110 acting against the weight of the high voltage power lines 14, 16, and 18 and with the first and second pistons 66, 72 stationary. However, if wind or some other outside force creates a galloping action or other significant conductor action in the high power lines 14, 16, 18, this external force is transferred to the energy absorbing devices 34, 36, 40 through the cables 82. The pistons 66, 72 yieldably resist any movement in response to these outside forces. If the outside force causes spring 82 to overcome the equilibrium of the pistons and force the pistons to the left, as viewed in FIG. 4, this movement is resisted by virtue of the compression of the air within first chamber 74 and the compression of the air within third chamber 78. The expansion of the air within second chamber 76 also resists this motion. However, the resistance is a passive yieldable resistance and can eventually be overcome by continued application of outside forces. The air within first chamber 74 is permitted to escape at a limited velocity through the air apertures 58 and through outlet opening 64. Similarly, air from third chamber 78 is permitted to be transferred into second chamber 76 through the central opening 55 in partition 54 which is slightly larger than the diameter of piston rod 70.

The resistive forces provided by the air within first, second and third chambers 74, 76, 78 is a passive resistive force. That is, the force does not cause movement of the pistons as is the case with spring 110, but it merely is a resistive force acting against any motion of the pistons. This resistive force also acts when the pistons are moved by outside forces to the right as viewed in FIG. 4. In that situation, the air within second chamber 76 is compressed and is transferred through central opening 56 into third chamber 78. Also, acting against this motion in this direction is the spring 110.

Spring 110, however, provides an active resistive force, and eventually returns the piston to its original equilibrium position after the outside forces being applied to the high power lines have subsided.

The amount of resistive force applied by spring 110 can be adjusted by rotatably threading lead screws 102, 104 until stop plate 98 has achieved the desired position and the compression within spring 110 has the desired compression within spring 110 has been achieved. The pulley 88 permits the forces exerted by the high voltage power lines 14 to be transferred and their direction changed so as to always act axially with respect to the longitudinal axis of cylindrical housing 42.

While not shown in the drawings, it is also possible to provide directional valving through piston 66 and/or piston 72 so as to reduce the air flow in the compression of chamber 74 and so as to increase the flow of air into chamber 74 when chamber 76 is being compressed.

The resulting air damping of the present invention gives apparent air spring behavior and minimizes the transfer of forces to the high power line tower 10 from the galloping action of the high voltage power lines 14, 16, and 18. All three types of galloping, i.e., vertical galloping, blowout galloping, and longitudinal galloping are subdued by virtue of the energy absorption devices of the present invention. The devices increase the duration of the impact force and lower the magnitude of the impact force so that the tower structure will react to the load as though it is a slowly applied static load. The dynamic aspect of these loads is thus reduced by virtue of the absorption of some of the vibrational energy. The device is also self-healing compared to other devices that must be replaced when so extended.

The use of pneumatic air chambers rather than hydraulic liquid chambers also provides an added advantage in that there is less maintenance required to deal with leaking fluids, etc. Thus, it can be seen that the device accomplishes at least all of its stated objectives.

What is claimed is:

1. A support for a power line and adapted for use on a support tower having a lower end supported on the ground and an upper end, said support comprising:

an elongated cylindrical housing having mounting means thereon for mounting said housing to said upper end of said support tower;

said cylindrical housing having a partition therein separating said housing into first and second cylindrical compartments; said partition having an opening therein providing communication between said first and second compartments;

said cylindrical housing having a first end wall provided with at least one air aperture therein for providing air communication from said first chamber to the exterior of said housing, said housing having a second end wall opposite from said first end wall and provided with an opening extending therethrough;

an elongated piston rod extending through said opening in said partition and having a first rod end within said first compartment and a second rod end within said second compartment;

a first piston on said first end of said rod and dividing said first compartment into first and second chambers;

a second piston on said second end of said rod and dividing said second compartment into third and fourth chambers; said first chamber being between said first end wall and said first piston, said second and third chambers being on opposite sides of said partition, and said fourth chamber being between said second piston and said second end wall;

an elongated flexible member connected to said second piston and extending through said fourth chamber and through said opening in said second wall for supporting connection to said power line;

spring means within said fourth chamber yieldably holding said second piston in a predetermined axial position within said second compartment;

said opening in said partition being larger than said piston rod so as to provide limited air passage back and fourth between said second and third chambers during reciprocating movement of said piston rod and said first and second pistons within said housing.

2. A power line support according to claim 1, wherein said spring means comprises an elongated coil spring, spring stop means being provided within said fourth chamber, said spring means being in compression between said second piston and said spring stop means.

3. A support according to claim 1 wherein said cylindrical housing includes a baffle compartment on the opposite side of said first end wall from said first chamber, said baffle compartment containing at least one baffle therein and said housing having a baffle opening providing air communication from said air opening in said first end wall through said baffle compartment to the exterior of said housing.

4. A support according to claim 1 comprising a spring stop plate movably mounted within said fourth compartment for axial movement therein, said spring means being between said stop plate and said second piston; adjustment means connected to said spring stop plate for holding said stop plate in plurality of preselected axial positions in said fourth chamber so as to adjust the amount of compression in said spring means.

5. A support according to claim 4 wherein said adjustment means comprise lead screw means threadably engaging said spring plate means.

6. A support according to claim 5 wherein said housing includes at least one longitudinal slot therein providing communication from the exterior thereof to said fourth chamber, said spring stop plate including tab means extending through said slot to the exterior of said housing for longitudinal sliding movement within said slot.

7. A support according to claim 6 wherein said lead screw means threadably engaged said tab means.

8. A support according to claim 1 wherein said first, second, third, and fourth chambers contain air only and are free from other fluid.

9. A support according to claim 1 wherein said spring means yieldably urges said second piston toward said partition in opposition to any load placed upon said flexible member when said flexible member is supportingly attached to said power line.

10. A power line support according to claim 9 wherein said spring means comprises a non linear spring which applies a variable resisting force in response to the extent to which it is formed.

* * * * *